(12) United States Patent
Kuang

(10) Patent No.: US 11,408,410 B2
(45) Date of Patent: Aug. 9, 2022

(54) PLASTIC AIR PUMP MECHANISM

(71) Applicant: GUANGZHOU ANTU ELECTRIC CO., LTD., Guangdong (CN)

(72) Inventor: Xinhua Kuang, Guangdong (CN)

(73) Assignee: GUANGZHOU ANTU ELECTRIC CO., LTD., Guangzhou (CN)

( * ) Notice: Subject to any disclaimer, the term of this patent is extended or adjusted under 35 U.S.C. 154(b) by 488 days.

(21) Appl. No.: 16/684,613

(22) Filed: Nov. 15, 2019

(65) Prior Publication Data

US 2020/0158099 A1    May 21, 2020

(30) Foreign Application Priority Data

Nov. 15, 2018   (CN) .......................... 201821886288.7

(51) Int. Cl.
  *F04B 35/04*   (2006.01)
  *B60S 5/04*    (2006.01)
  *F04B 39/12*   (2006.01)

(52) U.S. Cl.
  CPC .............. *F04B 35/04* (2013.01); *B60S 5/046* (2013.01); *F04B 39/12* (2013.01)

(58) Field of Classification Search
  CPC ........... F04B 35/04; F04B 39/12; B60S 5/046
  See application file for complete search history.

(56) References Cited

U.S. PATENT DOCUMENTS

| | | | | |
|---|---|---|---|---|
| 5,928,444 A | * | 7/1999 | Loewe | B60C 23/004 152/418 |
| 6,758,250 B2 | * | 7/2004 | Cowart | B60C 17/10 152/158 |
| 2009/0283191 A1 | * | 11/2009 | Isono | B60C 23/127 152/419 |
| 2011/0277877 A1 | * | 11/2011 | Stehle | B29C 73/166 141/38 |
| 2012/0234447 A1 | * | 9/2012 | Narloch | B60C 23/10 152/418 |

* cited by examiner

*Primary Examiner* — Patrick Hamo

(57) ABSTRACT

The application discloses a plastic air pump mechanism, which comprises a plastic body, a plastic output unit and an actuating unit; the plastic body has an integrally forming structure, which comprises a plastic cylinder and a plastic bracket disposed at an air inlet end of the plastic cylinder; the plastic output unit is detachably connected to an air outlet end of the plastic cylinder; the actuating unit comprises a motor, plastic gears disposed on the plastic bracket and electrically connected to the motor, and a plastic rocker arm driven by the plastic gears to realize reciprocating of a piston in the plastic cylinder; and a large body insert of metal is provided in an air outlet of the plastic cylinder. The plastic air pump mechanism can reduce product weight, simplify production and installation processes, save materials and labor costs, and reduce self weight of a vehicle.

10 Claims, 3 Drawing Sheets

PLASTIC AIR PUMP MECHANISM

CROSS REFERENCE TO RELATED APPLICATIONS

The present application claims the benefit of Chinese Patent Application No. 201821886288.7 filed on Nov. 15, 2018, the contents of which are incorporated herein by reference in their entirety.

FIELD OF THE APPLICATION

The application relates to the technical field of air pumps, in particular to a plastic air pump mechanism.

BACKGROUND OF THE APPLICATION

An air pump mechanism is a main functional component of an air pump (also known as a blast pump, or an inflator), in which power is provided through operation of a motor to drive a piston to compress air, and then the compressed air is output, such that air inflation is completed. The working process of the air pump mechanism comprises the following steps: the motor operates, when air is pumped into the air pump, movement of the piston rod decreases air pressure in an air cylinder, a valve of a communicating vessel is opened by the external atmospheric pressure, and air enters the air cylinder; and when air is pumped into a tire, the movement of the piston rod increases the air pressure in the air cylinder, and the valve is closed by the air pressure in the cylinder, and air enters the tire.

At present, air pumps are widely used in vehicles, motorcycles, bicycles, rubber balls, rubber boats, and the like. The air pumps can give full play to superiority in some emergency situations. For example, when a tire is punctured and cannot be transferred to a repair shop immediately, an air pump can be used to temporarily inflate to ensure normal driving. In addition, a suitable vehicle tire pressure is critical to fuel efficiency of a vehicle, safety of a vehicle, tire life and operational performance of a vehicle. Periodically detecting tire pressure by using an air pump and inflating the tire in time when the tire pressure is insufficient can protect tires and wheels to extend the tire life.

An existing air pump generally includes a motor, a bracket, a gear, a support shaft, a piston, a cylinder, etc. Since the motor provides power and a certain air pressure is created, each component of the air pump needs to bear a certain pressure, and each component needs to be resistant to high temperature, high pressure, wear, impact, etc. At present, the air pumps on the market are substantively made of alloy materials. The cylinder is made of aluminum alloy, seamless steel pipe, or alloy mixed with plastic, so as to meet requirements of various components. However, the manufacturing process is complicated, weight of the air pump is too high, the cost is high, and it is inconvenient to use. Besides, connection among components are performed with a large number of set screws due to metal material characteristics, and it is inconvenient for workers to perform installation as there are many stations to be installed, which indirectly increase cost of a product. Further, the self weight of a vehicle is large and the fuel consumption is large, which causes a waste of resources.

SUMMARY OF THE APPLICATION

In order to overcome the above problems in the background, the application provides a plastic air pump mechanism capable of reducing product weight, simplifying production and installation processes, saving materials and labor costs, and reducing self weight of a vehicle.

Based on this, the application provides a plastic air pump mechanism, which comprises a plastic body, a plastic output unit and an actuating unit; the plastic body has an integrally formed structure, which comprises a plastic cylinder and a plastic bracket disposed at an air inlet end of the plastic cylinder; the plastic output unit is detachably connected to an air outlet end of the plastic cylinder;

the actuating unit comprises a motor, plastic gears disposed on the plastic bracket and electrically connected to the motor, and a plastic rocker arm driven by the plastic gears to realize reciprocating movement of a piston in the plastic cylinder; and a large body insert made of a metal material is embedded in an air outlet of the plastic cylinder.

As a preferred embodiment, the large body insert has a hollow circular structure, and two ends of the large body insert are respectively provided with a first flange and a second flange which are clamped inside the air outlet of the plastic cylinder.

As a preferred embodiment, the plastic gears comprise a small gear electrically connected to the motor and a large gear meshing with the small gear; both the small gear and the large gear are pivotally connected to the plastic bracket; and the plastic gears are made of a nylon material mixed with 25% to 35% of glass fiber.

As a preferred embodiment, an outer side of the large gear is provided with an eccentric shaft; one end of the plastic rocker arm is sleeved on the eccentric shaft through a bearing, and the other end of the plastic rocker arm is fixedly connected to the piston.

As a preferred embodiment, an output shaft of the motor comprises two ends, wherein one end of the output shaft is connected to the small gear, and the other end of the output shaft is connected with a vane.

As a preferred embodiment, the plastic body is made of a high-strength nylon material mixed with 25% to 35% of glass fiber, and the plastic cylinder is cylindric.

As a preferred embodiment, the plastic rocker arm is made of a nylon material mixed with 25% to 35% of glass fiber.

As a preferred embodiment, a seal ring is provided between the plastic output unit and the air outlet end of the plastic cylinder.

As a preferred embodiment, the large body insert is made of a brass material; a reinforcing rib is connected between the plastic cylinder and the plastic bracket; and the plastic cylinder, the plastic bracket and the reinforcing rib are in an integrally formed structure.

As a preferred embodiment, the air outlet end of the plastic cylinder is provided with a screw mounting position, and edge of the plastic output unit corresponding to the screw mounting position is provided with a through hole.

Compared with the prior art, the application has the following advantages:

The plastic air pump mechanism according to the application comprises the plastic body, the plastic output unit and the actuating unit. The plastic body is designed as an integrally formed structure by replacing alloy parts of a conventional air pump except for the motor with respective plastic parts, and the large body insert made of a metal material is embedded in the air outlet of the plastic cylinder, which can not only greatly reduce weight of the air pump mechanism, simplify production and installation processes, save materials and labor costs, and reduce self weight of a vehicle, but also solve the problem that an air pump made of engineering plastics alone cannot withstand high temperature and high pressure, thus improving reliability and durability of the plastic air pump mechanism.

Figure 1:
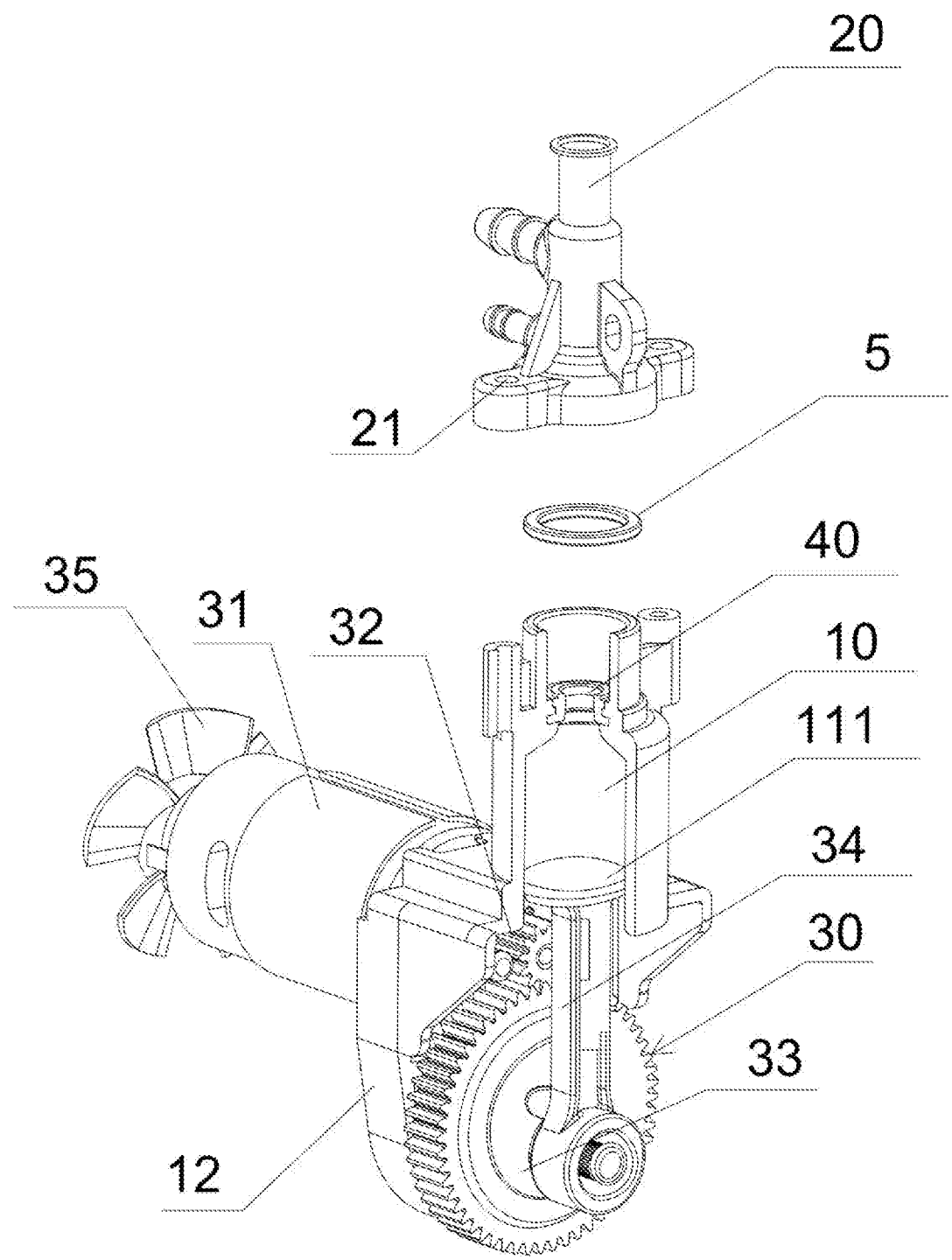
FIG. 1 is a schematic decomposed partial section view of a plastic air pump mechanism according to an embodiment of the application.

In drawings: 10, plastic body; 11, plastic cylinder; 111, piston; 112, screw mounting position; 12, plastic bracket; 13, reinforcing rib; 20, plastic output unit; 21, through hole; 30, actuating unit; 31, motor; 32, small gear; 33, large gear; 34, plastic rocker arm; 35, vane; 40, large body insert; 41, first flange; 42, second flange; 43, transition corner; and 5, sealing ring.

DETAILED DESCRIPTION OF PREFERRED EMBODIMENTS

The specific implementations of the application are further described in detail below with reference to the drawings and embodiments. The following embodiments are intended to illustrate the application, but are not intended to limit the scope of the application.

In the description of the application, it should be noted that, orientation or positional relationships indicated by the terms "center", "longitudinal", "lateral", "upper", "lower", "front", "back", "left", "right" "vertical", "horizontal", "top", "bottom", "inside", "outside", and the like are based on orientation or positional relationships shown in the drawings, which are only for conveniently describing the application and simplifying the description, rather than indicating or implying that the referred device or component must have a specific orientation, or be constructed and operated in a specific orientation, such that these terms cannot be understood as limitation of the application. In addition, the terms "first" and "second" as used herein are used only for purposes of describing, and cannot be understood as indicating or implying relative location.

Figure 2:
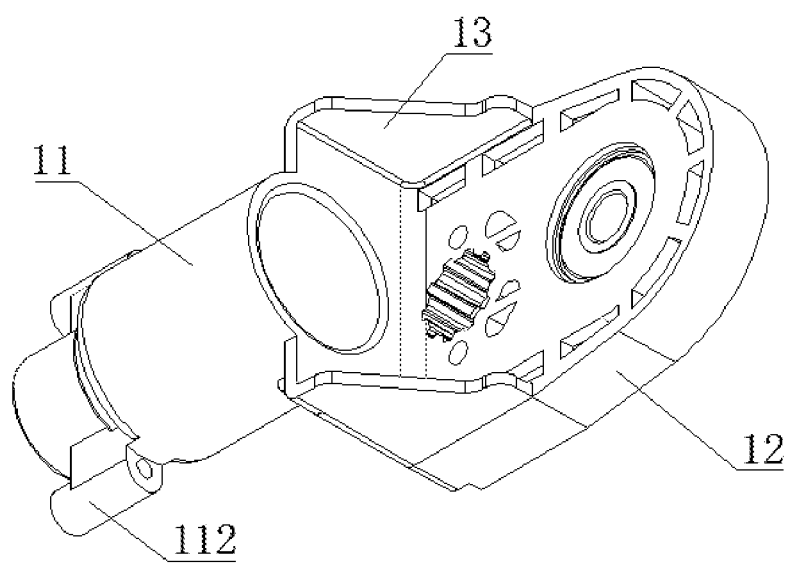
FIG. 2 is a schematic perspective view of a plastic body according to an embodiment of the application.
Figure 3:
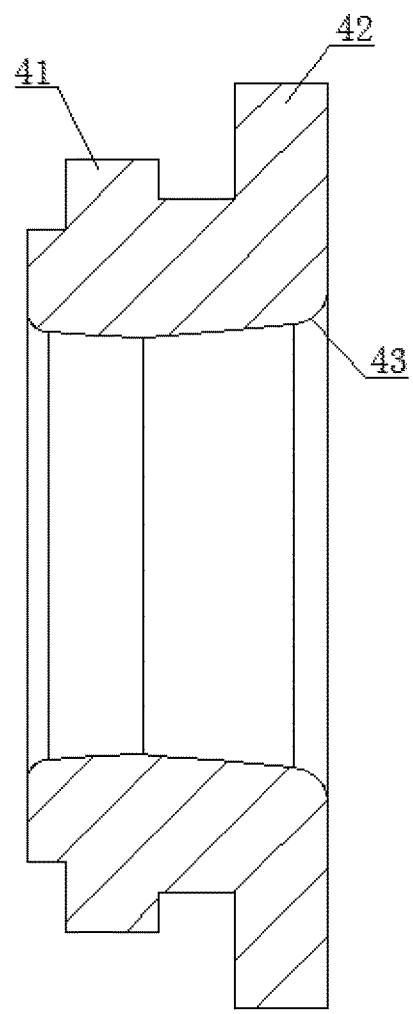
FIG. 3 is a longitudinal cross-sectional view of a large body insert according to an embodiment of the application.

Refer to FIGS. 1, 2 and 3, a plastic air pump mechanism according to the application is schematically illustrated, which comprises a plastic body 10, a plastic output unit 20 and an actuating unit 30. The plastic body 10 has an integrally formed structure, and the plastic body 10 specifically comprises a plastic cylinder 11 and a plastic bracket 12 disposed at an air inlet end of the plastic cylinder 11, and the plastic output unit 20 is detachably connected to an air outlet end of the plastic cylinder 11. The actuating unit 30 comprises a motor 31, plastic gears and a plastic rocker arm 34. The plastic gears are disposed to the plastic bracket 12 and electrically connected to the motor 31. The plastic rocker arm 34 is driven by the plastic gears to realize reciprocating sliding movement of the piston 111 in the plastic cylinder 11, such that air inflation of a tire is completed. It is important that a large body insert 40, which is made of a metal material, is embedded in the air outlet of the plastic cylinder 11.

In the plastic air pump mechanism based on the above technical features, alloy parts of a conventional air pump, except for the motor 31, are replaced with respective plastic parts. In other words, the plastic body 10, the plastic output unit 20, the plastic gears and the plastic rocker arm 34 are all made of engineering plastic materials, which can greatly reduce weight of the air pump mechanism and reduce self weight of a vehicle, thereby reducing weight of the whole machine by more than 30%. The plastic body 10 is designed as an integrally formed structure, for example, the plastic cylinder 11 and the plastic bracket 12 are integrally formed by an injection molding process, which can simplify production and installation processes, save materials and labor costs, and greatly reduces assembly time especially in mass production. Since the air outlet of the plastic cylinder 11 needs to withstand more stringent conditions of high temperature and high pressure than other parts, the large body insert 40 made of a metal material is embedded in the air outlet of the plastic cylinder 11 to meet the requirements of high pressure and high temperature resistance, such that the problem that a whole air pump made of engineering plastics cannot withstand high temperature and high pressure is solved, thus improving reliability and durability of the air pump. The large body insert 40 is a machined piece, preferably made of a brass material. The plastic body 10 is made of a high-strength nylon material mixed with 25% to 35% of glass fiber, which enhances mechanical strength, hardness and rigidity of the plastic body 10. The addition of glass fiber enhances tensile strength of the plastic body 10. Preferably, the plastic body 10 is made of PA66 (nylon-66) mixed with 30% glass fiber.

Figure 4:
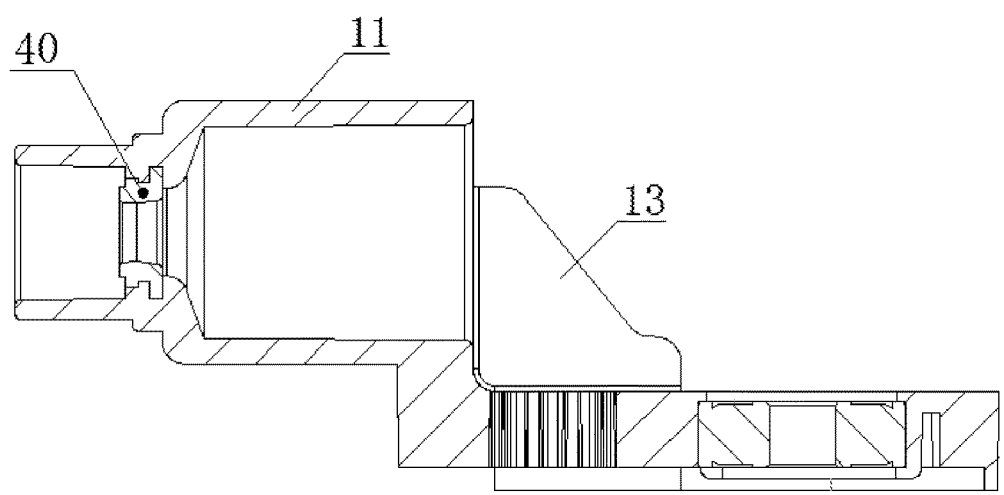
FIG. 4 is a schematic assembly view showing that the large body insert of FIG. 3 is mounted in the plastic body of FIG. 2.

Specifically, as shown in FIGS. 3 and 4, the large body insert 40 has a hollow circular structure, the plastic cylinder 11 is cylindric, and both ends of the large body insert 40 are respectively provided with a first flange 41 and a second flange 42 which are clamped inside the air outlet of the plastic cylinder 11, such that the large body insert 40 can be placed in an injection molding machine and be subjected to injection molding together with the plastic body 10, and the large body insert 40 can be securely embedded in the air outlet of the plastic cylinder 11 through the first flanges 41 and the second flanges 42. Each of both ends of the large body insert 40 is provided with a transitional corner 43, which can further ensure smoothness and flatness of the air outlet plane, thereby meeting sealing and air leakage prevention requirements.

More specifically, as shown in FIG. 1, the plastic gears include a small gear 32 that is electrically connected to the motor 31 and a large gear 33 that meshes with the small gear 32. Both the small gear 32 and the large gear 33 are pivotally connected to the plastic bracket 12. An outer side of the large gear 33 is provided with an eccentric shaft. One end of the plastic rocker arm 34 is sleeved on the eccentric shaft, and the other end of the plastic rocker arm 34 is fixedly connected to the piston 111. Thus, a crank slider mechanism is formed through connection among the large gear 33, the plastic rocker arm 34, the piston 111 and the plastic cylinder 11. The rotation speed of the large gear 33 is adjusted by adjusting the gear ratio of the large gear 33 to the small gear 32. The motor operates to drive the small gear 32 to rotate so as to drive the large gear 33 to rotate, and the plastic rocker arm 34 is swung by the eccentric shaft of the large gear 33, which realizes upper and lower reciprocating movements of the piston 111 so as to generate air pressure, such that the process of inflating a tire is completed in cooperation with the plastic output unit 20. The nylon material mixed with 25% to 35% of glass fiber has characteristics of high strength, high toughness, and low wear resistance, so it can be applied to gears.

Preferably, the output shaft of the motor 31 includes two ends, one end is connected to the small gear 32 and the other end is connected to a vane 35. When the motor 31 operates, the output shaft drives the vane 35 to rotate to cool the entire air pump mechanism. At the same time, the output shaft drives the small gear 32 to rotate, and the small gear 32 drives the large gear 33 to rotate, so that the piston 111 reciprocates in the plastic cylinder 11.

As a preferred embodiment, the plastic rocker arm 34 is made of a nylon material mixed with 25% to 35% of glass fiber, so that the plastic rocker arm has characteristics of high strength, high toughness and low wear resistance. In order to improve the connection strength between the plastic cylinder 11 and the plastic bracket 12, a reinforcing rib 13 is connected therebetween. The plastic cylinder 11, the plastic bracket 12 and the reinforcing rib 13 are in an integrally formed structure.

Further preferably, as shown in FIGS. 1 and 2, the air outlet end of the plastic cylinder 11 is provided with a screw mounting position 112, and edge of the plastic output unit 20 corresponding to the screw mounting position 112 is provided with a through hole 21. When the output unit 20 is being mounted to the air outlet end of the plastic cylinder 11, the through hole 21 of the plastic output unit 20 is aligned with the screw mounting position 112 of the plastic cylinder 11, and a screw is inserted into the through hole 21 for locking, such that the plastic output unit 20 is detachably connected to the plastic cylinder 11. Further, a sealing ring 5 is provided between the plastic output unit 20 and the air outlet end of the plastic cylinder 11 to meet sealing and air leakage prevention requirements.

In summary, in the plastic air pump mechanism according to the application, alloy parts of a conventional air pump, except for a motor, are replaced with respective plastic parts, the plastic body is designed as an integrally formed structure, and a large body insert made of a metal material is embedded in the air outlet of the plastic cylinder, which can not only greatly reduce weight of the air pump mechanism, simplify production and installation processes, save materials and labor costs, and reduce self weight of the vehicle, but also meet requirements of high pressure and high temperature resistance of an alloy body, which improves reliability and durability of the plastic air pump mechanism, and has a high application and popularization value.

The above description is only preferred embodiments of the application, and it should be noted that those skilled in the art can make several improvements and substitutions without departing from the technical principles of the application, which improvements and substitutions are also considered to be the scope of protection of the application.

What is claimed is:

1. A plastic air pump mechanism, wherein the plastic air pump mechanism comprises a plastic body, a plastic output unit and an actuating unit; the plastic body has an integrally formed structure, which comprises a plastic cylinder and a plastic bracket disposed at an air inlet end of the plastic cylinder; the plastic output unit is detachably connected to an air outlet end of the plastic cylinder;

the actuating unit comprises a motor, plastic gears disposed to the plastic bracket and electrically connected to the motor, and a plastic rocker arm driven by the plastic gears to realize reciprocating movement of a piston in the plastic cylinder; and a large body insert made of a metal material is embedded in an air outlet of the plastic cylinder.

2. The plastic air pump mechanism according to claim 1, wherein the large body insert has a hollow circular structure, and two ends of the large body insert are respectively provided with a first flange and a second flange which are clamped inside the air outlet of the plastic cylinder.

3. The plastic air pump mechanism according to claim 1, wherein the plastic gears comprise a small gear electrically connected to the motor and a large gear meshing with the small gear; both the small gear and the large gear are pivotally connected to the plastic bracket; and the plastic gears are made of a nylon material mixed with 25% to 35% of glass fiber.

4. The plastic air pump mechanism according to claim 3, wherein an outer side of the large gear is provided with an eccentric shaft; one end of the plastic rocker arm is sleeved on the eccentric shaft through a bearing, and the other end of the plastic rocker arm is fixedly connected to the piston.

5. The plastic air pump mechanism according to claim 3, wherein an output shaft of the motor comprises two ends, one end of the output shaft is connected to the small gear, and the other end of the output shaft is connected with a vane.

6. The plastic air pump mechanism according to claim 1, wherein the plastic body is made of a high-strength nylon material mixed with 25% to 35% of glass fiber, and the plastic cylinder is cylindric.

7. The plastic air pump mechanism according to claim 1, wherein the plastic rocker arm is made of a nylon material mixed with 25% to 35% of glass fiber.

8. The plastic air pump mechanism according to claim 1, wherein a seal ring is provided between the plastic output unit and the air outlet end of the plastic cylinder.

9. The plastic air pump mechanism according to claim 1, wherein the large body insert is made of a brass material; a reinforcing rib is connected between the plastic cylinder and the plastic bracket; and the plastic cylinder, the plastic bracket and the reinforcing rib are in an integrally formed structure.

10. The plastic air pump mechanism according to claim 8, wherein the air outlet end of the plastic cylinder is provided with a screw mounting position, and edge of the plastic output unit corresponding to the screw mounting position is provided with a through hole.

* * * * *